United States Patent
Monti et al.

(10) Patent No.: US 9,094,100 B2
(45) Date of Patent: Jul. 28, 2015

(54) COMBINATION PROTECTIVE CASE HAVING SHOCKING PERSONAL DEFENSE SYSTEM WITH CELLULAR PHONE

(71) Applicant: Dekka Technologies LLC, Houma, LA (US)

(72) Inventors: Kyle Monti, Luling, LA (US); Daryl Marse, Luling, LA (US)

(73) Assignee: Dekka Technologies LLC, Houma, LA (US)

( * ) Notice: Subject to any disclaimer, the term of this patent is extended or adjusted under 35 U.S.C. 154(b) by 0 days.

(21) Appl. No.: 14/209,433

(22) Filed: Mar. 13, 2014

(65) Prior Publication Data
US 2014/0370945 A1    Dec. 18, 2014

Related U.S. Application Data

(63) Continuation of application No. 13/775,712, filed on Feb. 25, 2013, now abandoned.

(60) Provisional application No. 61/602,669, filed on Feb. 24, 2012.

(51) Int. Cl.
*H04M 1/00* (2006.01)
*H04B 1/3888* (2015.01)
(Continued)

(52) U.S. Cl.
CPC .......... *H04B 1/3888* (2013.01); *F41H 13/0012* (2013.01); *F41H 13/0018* (2013.01);
(Continued)

(58) Field of Classification Search
CPC ........ H04B 1/38; H04B 1/385; H04B 1/3833; H04B 1/3888; H04M 1/0214; H04M 1/0283

USPC ........................ 455/90.3, 550.1, 575.1–575.8
See application file for complete search history.

(56) References Cited

U.S. PATENT DOCUMENTS

| 4,186,851 A | 2/1980 | Cantor |
| 4,446,990 A | 5/1984 | Stevenson et al. |

(Continued)

FOREIGN PATENT DOCUMENTS

| KR | 1020110068190 | 6/2011 |
| TW | 201119332 | 6/2011 |
| WO | WO 2013126871 | 8/2013 |

OTHER PUBLICATIONS

PCT International Search Report completed Jun. 4, 2013 for PCT/US 2013/027597.

*Primary Examiner* — Nhan Le
(74) *Attorney, Agent, or Firm* — Brett A. North; Garvey, Smith, Nehrbass, and North, LLC.

(57) ABSTRACT

A combination cellular phone and personal defense system for providing both a means of communication along with a means of self-defense in one unit. Provided is a detachably connectable protective case for a cellular phone, which when the cell phone is connected to the protective case, the combination cell phone and protective case is converted into a personal defense system with cell phone maintaining substantially all of its functionality. One embodiment relates to smart cellular phones and more particularly pertains to a new combination protective case for cellular phone which, when detachably connected to a cell provide, includes a personal defense system and phone system in one unit. In one embodiment the detachably connectable protective case with integrated self defense system which can be interchangeable with other cell phones of the same or similar designs. The circuit can be included in case geometries that accommodate phones from any manufacturer, including but not limited to smart phones such as iPhones.

14 Claims, 9 Drawing Sheets

(51) Int. Cl.
  *H04M 1/02*      (2006.01)
  *H04M 11/04*     (2006.01)
  *H05C 1/00*      (2006.01)
  *F41H 13/00*     (2006.01)

(52) U.S. Cl.
  CPC .......... *H04M 1/0202* (2013.01); *H04M 1/0249*
          (2013.01); *H04M 11/04* (2013.01); *H05C 1/00*
              (2013.01); *Y10T 29/49826* (2015.01)

(56) References Cited

U.S. PATENT DOCUMENTS

| | | |
|---|---|---|
| 4,624,389 A | 11/1986 | Ang |
| 4,688,140 A | 8/1987 | Hammes |
| 4,982,645 A | 1/1991 | Abboud |
| D343,172 S | 1/1994 | Watanabe |
| D350,744 S | 9/1994 | Hino |
| 5,422,656 A | 6/1995 | Allard et al. |
| 5,429,301 A | 7/1995 | Franks |
| 5,446,789 A | 8/1995 | Loy et al. |
| 5,476,192 A | 12/1995 | Julinot |
| 5,531,359 A | 7/1996 | Winner |
| 5,988,450 A | 11/1999 | Cessarino |
| 6,043,626 A | 3/2000 | Snyder et al. |
| 6,580,908 B1 | 6/2003 | Kroll et al. |
| 6,636,412 B2 | 10/2003 | Smith |
| 6,785,566 B1 * | 8/2004 | Irizarry .................... 455/575.8 |
| 6,980,777 B2 * | 12/2005 | Shepherd et al. ............ 455/90.3 |
| 7,057,872 B2 | 6/2006 | Smith et al. |
| 7,075,770 B1 | 7/2006 | Smith |
| 7,102,870 B2 | 9/2006 | Nerheim |
| 7,143,539 B2 | 12/2006 | Cerovic et al. |
| 7,145,762 B2 | 12/2006 | Nerheim |
| 7,158,362 B2 | 1/2007 | Smith |
| 7,218,077 B2 | 5/2007 | Nerheim |
| 7,280,340 B2 | 10/2007 | Smith et al. |
| 7,336,472 B2 | 2/2008 | Nerheim et al. |
| 7,400,917 B2 * | 7/2008 | Wood et al. ................ 455/575.8 |
| 7,457,096 B2 | 11/2008 | Brundula |
| 7,457,636 B2 | 11/2008 | Kroll et al. |
| 7,483,715 B2 | 1/2009 | Kroll et al. |
| 7,580,237 B2 | 8/2009 | Nerheim |
| 7,602,598 B2 | 10/2009 | Nerheim |
| 7,805,158 B2 | 9/2010 | Kroll et al. |
| 7,821,766 B2 | 10/2010 | Brundula |
| 7,986,506 B2 | 7/2011 | Brundula |
| 7,986,965 B2 | 7/2011 | Kroll et al. |
| 8,028,794 B1 * | 10/2011 | Freeman ....................... 181/202 |
| 8,253,371 B2 | 8/2012 | Vitanov et al. |
| 8,472,915 B2 | 6/2013 | Di Perna et al. |
| 8,934,213 B2 | 1/2015 | Froom et al. |
| 2013/0092565 A1 | 4/2013 | Swope |

* cited by examiner

COMBINATION PROTECTIVE CASE HAVING SHOCKING PERSONAL DEFENSE SYSTEM WITH CELLULAR PHONE

CROSS-REFERENCE TO RELATED APPLICATIONS

This is a continuation of U.S. patent application Ser. No. 13/775,712, filed Feb. 25, 2013 which is non-provisional of U.S. Provisional Patent Application Ser. No. 61/602,669, filed 24 Feb. 2012, each of which are incorporated herein by reference and to/of which priority is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND

One embodiment relates to smart cellular phones and more particularly pertains to a new combination protective case for cellular phone which, when detachably connected to a cell provided, includes a personal defense system and phone system in one unit.

In one embodiment the detachably connectable protective case with integrated self defense system can be interchangeable with other cell phones of the same or similar designs. The circuit can be included in case geometries that accommodate phones from any manufacturer, including but not limited to smart phones such as iPhones.

Known prior art includes U.S. Pat. No. 5,988,450 to Cassarino; U.S. Pat. No. 4,624,389 to Ang; U.S. Pat. No. 4,446,990 to Stevenson et al.; U.S. Pat. No. 5,422,656 to Allard et al.; U.S. Pat. No. 5,446,789 to Loy et al.; U.S. Pat. No. Des. 350,744 to Hino; and U.S. Pat. No. Des. 343,172 to Watanabe which are all incorporated by reference herein.

Other known prior art includes U.S. Pat. No. 4,186,851; U.S. Pat. No. 4,982,645; U.S. Pat. No. 5,429,301; U.S. Pat. No. 5,476,192; and U.S. Pat. No. 5,531,359.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

SUMMARY

In view of the foregoing disadvantages inherent in the known types of cellular phones and personal defense devices in the prior art, one embodiment provides a new combination detachably connectable protective case for a cellular phone, which case when connected to the housing of a cell phone, converts the cellular phone into a personal defense system while allowing the cell phone to maintain, substantially, all of its functionality.

In one embodiment the cell phone includes a housing, display, keypad (which can be a touch screen and incorporated into the display), antenna, and power supply. In one embodiment the cell phone's power supply is a rechargeable battery.

In one embodiment is provided a detachably connectable protective case having an electrical personal defense system, the protective case being detachably connectable to the housing of a cell phone.

In one embodiment a personal defense system is incorporated into the protective case.

In one embodiment the personal defense system includes a shocking method and apparatus.

In one embodiment is provided a new combination cellular phone and protective case incorporating a personal defense system for providing users both a means of communication and a means of self-defense in a single combined hand held unit.

In one embodiment is provided a combination cellular phone and detachably connectable protective case, which case incorporates a personal defense system, and which case allows substantially all functionality of the cell phone when the case is attached to the housing of a cell phone.

In various embodiments the cell phone can be generally rectangular in shape having a phone length, width, and depth. In one embodiment the protective case can be rectangular in shape having a case length, width and depth. In one embodiment the case length and width dimensions are within 1, 2, 3, 4, 5, 6, 7, 8, 9, 10, 11, 12, 13, 14, or 15 percent of the respective cell phone length and width dimensions. In various embodiments the respective dimensions fall within a range of any two of the above specified percentages.

In one embodiment the ratio of the case's depth dimension to the cell phone's depth dimension is less than 1.1, 1.2, 1.3, 1.4, 1.5, 1.6, 1.7, 1.8, 1.9, 2, 2.2, 2.4, 2.5, 2.6, 2.8, and 3. In various embodiments the ratio falls within a range of any two of the above specified ratios.

In one embodiment a battery power the personal defense system can be operably connected to the cell phone, and in another embodiment can be used to recharge the cell phone's rechargeable battery (such as at the user's option).

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

One embodiment relates to smart cellular phones and more particularly pertains to a new combination protective case 300 for cellular phone 100 which includes a personal defense system 400 for providing both phone 100 and self-defense system 400 in one unit, which self defense system 400 is included in a protective casing 300 for the cell phone 1100 and interchangeable with other cell phones 100', 100", etc. of the same or similar designs. Protective casing 300 can be modified to various mobile phones, and smart phones, such as the Apple iPhone, Motorola Droid, T-Mobile LG G2X, HTC EVO 3D, HTC Thunderbolt, Ericsson Xperia Play, Google Nexus, HP Pre, and Dell Venue Pro. Protective case 300 would be modified to fit the particular geometry and size of the cell phone 100 on which it is to be detachably connected.

Figure 1:
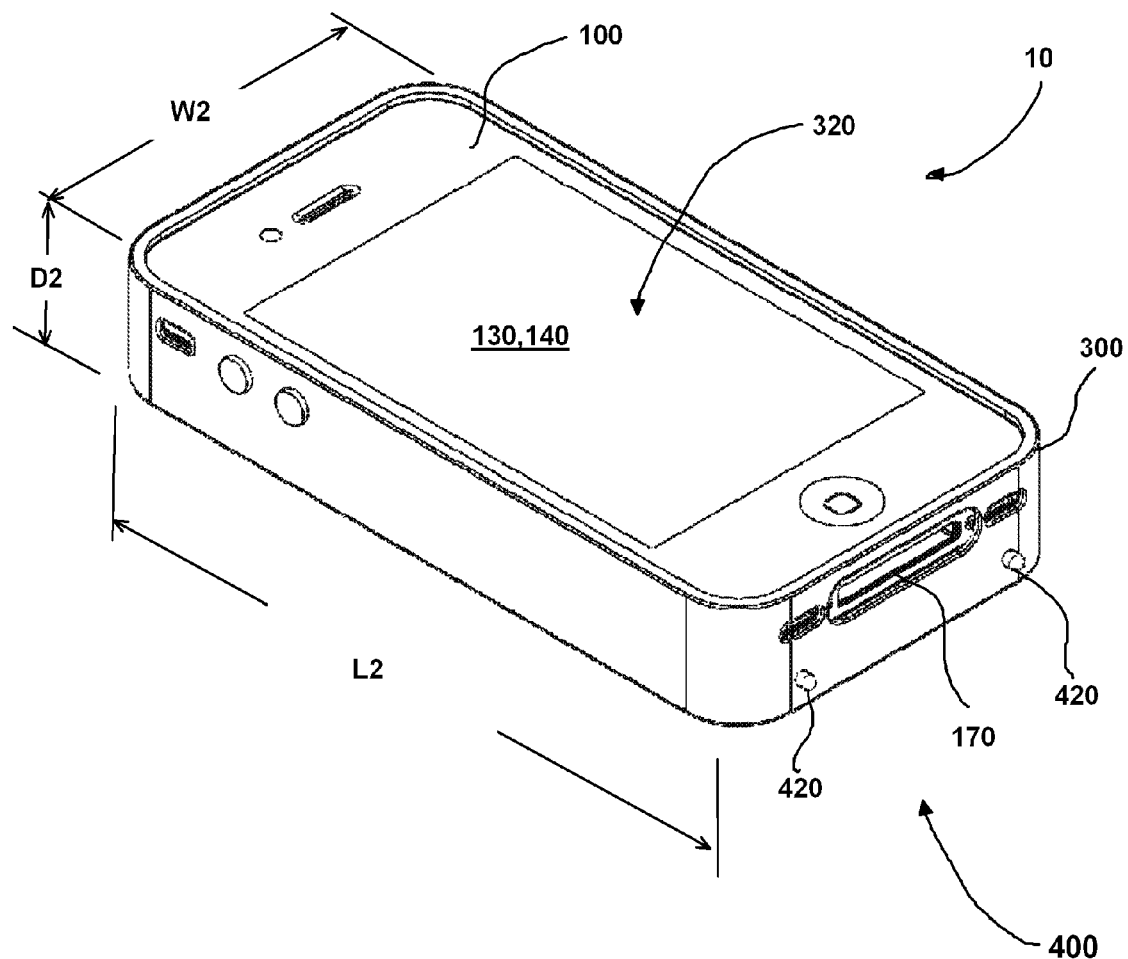
FIG. 1 is a perspective view of the one embodiment.
Figure 2:
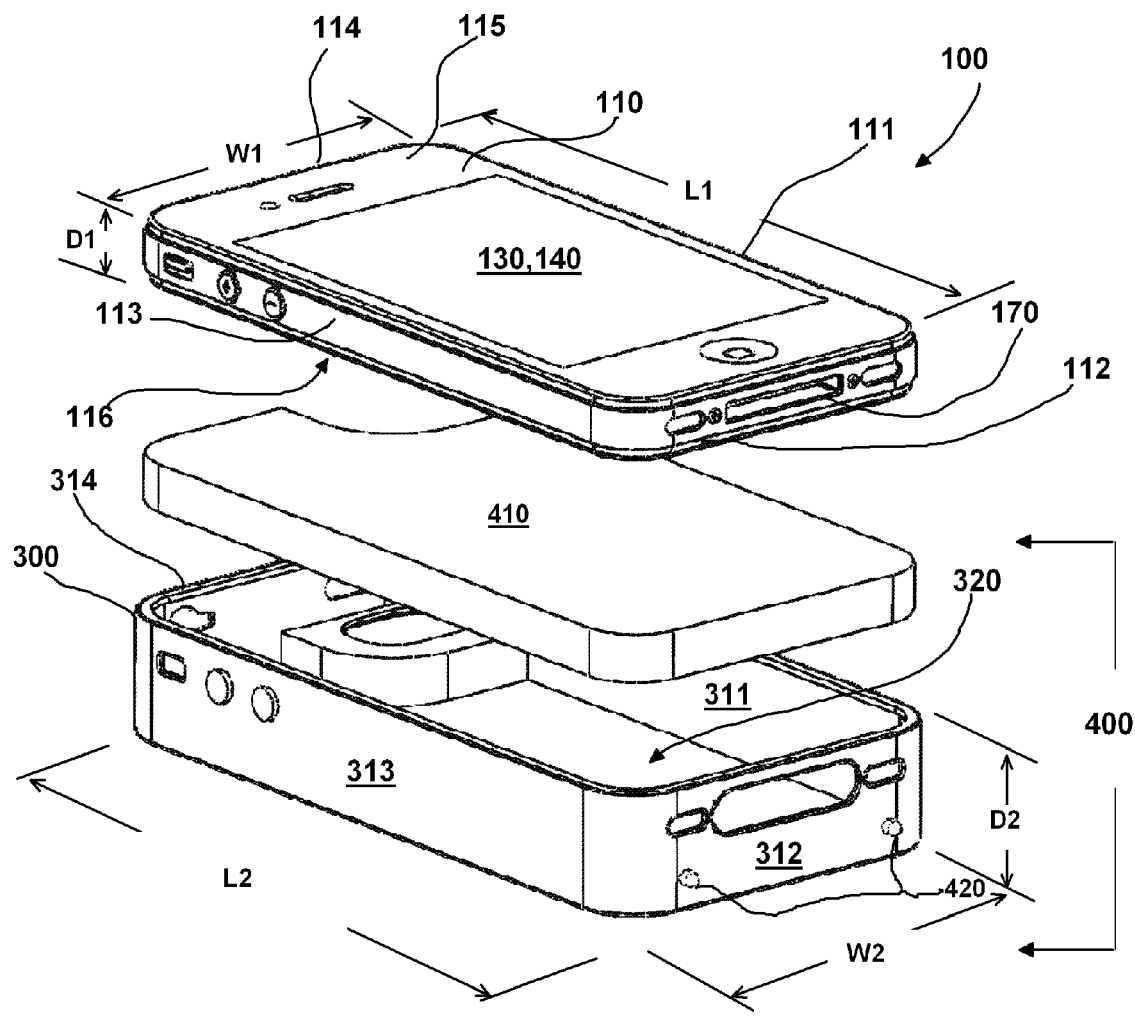
FIG. 2 is an exploded perspective view of the embodiment shown in FIG. 1.
Figure 3:
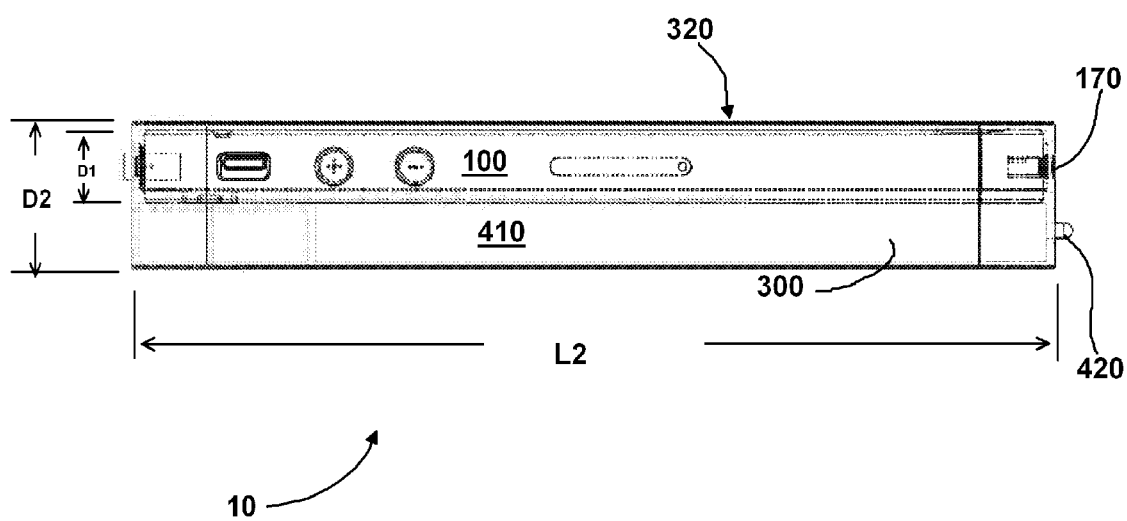
FIG. 3 is a side view of the embodiment shown in FIG. 1.

FIG. 1 is a perspective view of the one embodiment of the combined protective case 300 (with personal defense system 400) detachably connected to a cell phone 100. FIG. 2 is an exploded perspective view of the embodiment shown in FIG. 1. FIG. 3 is a side view of the embodiment shown in FIG. 1.

The combination cellular phone and protective case/personal defense system 10 comprises a cellular telephone 100 having a housing 110. Inside housing 110 are the cellular phone electronics 120 including a CPU, a transmitter, and a receiver. Housing 110 further includes a visual display 130 (which can include a touch-type keyboard 140), an antenna 150, and battery 160, all electrically connected to the cellular phone electronics 120.

First rechargeable battery 160 can be disposed in housing 110 and electrically connected to the cellular phone electronics 120. One side wall 111 of the housing 110 can be a connection/recharge port 190 extending inwardly thereof. Recharge port can be electrically connected to rechargeable battery 160 to permit electrically connecting battery 160 to an external power supply for recharging of battery 160.

Cell phone housing 110 can have walls 111, 112, 113, 114, 115, and 116. Cell phone housing 110 can have dimensions of length L1, width W1, and Depth D1.

Protective case 300 can have walls 311, 312, 313, 314, and 315, with interior 320. Protective case can have dimensions of length L2, width W2, and Depth D2.

In various embodiments cell phone housing 110 can be generally rectangular in shape having a length L1, width W1, and depth D1. In one embodiment protective case 300 can be generally rectangular in shape having a case length L2, width W2, and depth D2. In one embodiment the case 300 length L2 and width W2 dimensions are within 1, 2, 3, 4, 5, 6, 7, 8, 9, 10, 11, 12, 13, 14, or 15 percent of the respective cell phone housing's 110 length L1 and width W1 dimensions. In various embodiments the respective dimensions fall within a range of any two of the above specified percentages.

In one embodiment the ratio of the case's 300 depth D2 dimension to the cell phone housing's 110 depth D1 (D2/D1) dimension is less than 1.1, 1.2, 1.3, 1.4, 1.5, 1.6, 1.7, 1.8, 1.9, 2, 2.2, 2.4, 2.5, 2.6, 2.8, and 3. In various embodiments the ratio falls within a range of any two of the above specified ratios.

A personal defense system 400 is incorporated into the protective case 300 which comprises shocking system 410, having a shocking circuit 500, a pair of shocking prongs 420 electrically connected to shocking circuit 500, with shocking circuit powered by power source 440 such as a battery, which is an independent power source compared to battery 160 of cell phone 100. Personal defense system can be mounted in the interior 320 of protective case 330, and shocking prongs 420 can extend outwardly from protective case 300 as shown in FIGS. 1-3.

In an alternative embodiment shocking prongs 420 can extend outwardly from the opposing side (i.e., wall 312 or upper portion) than the side shown in FIGS. 1-3 (wall 312 or lower portion). In another alternative embodiment, shocking prongs 420 can be provided for both wall 312 and wall 314.

In one embodiment personal defense system 400 can include activation switch 430 electrically connected to shocking circuit 500 for selectively activating shocking circuit 500 to emit from shocking prongs 420 a defensive electric shock.

In one embodiment shocking system 410 can include a safety switch 450 having safety and non-safety modes, and is electrically connected to activation switch 430 to permit selective activation of activation switch 430 only when safety switch is in a non-safety mode. In use, activation of safety switch 450 permits activation of activation switch 430 to power shocking system 410 only while safety switch 450 is in a non-safety mode thus providing a safety feature preventing accidental shocking of a user when using cellular phone 100 to communicate.

Shocking system 410 can be powered by power source 440 (which can be a rechargeable battery) disposed in the interior 320 of protective case 300 and electrically connected to shocking circuit 500. Preferably, protective case 300 includes a recharge port 350.

In use, the present invention affords the user of a luxury of a user having the option of incorporating a personal defense system into a conventionally available cellular phone.

Battery 440 can provide power to shocking circuit 500. Shocking circuit 500 can be in various forms which are described below in relation to FIGS. 4-9.

FIGS. 4-9 show various embodiments of shocking circuit 500, 500', and 500" which can be generally categorized as: (a) BEMF through capacitor/inductor to voltage multiplier; (b) LOPT or Trigger Transformer Step-up to voltage multiplier; and (c) Piezoelectric HV production+Low voltage current production.

Figure 4:
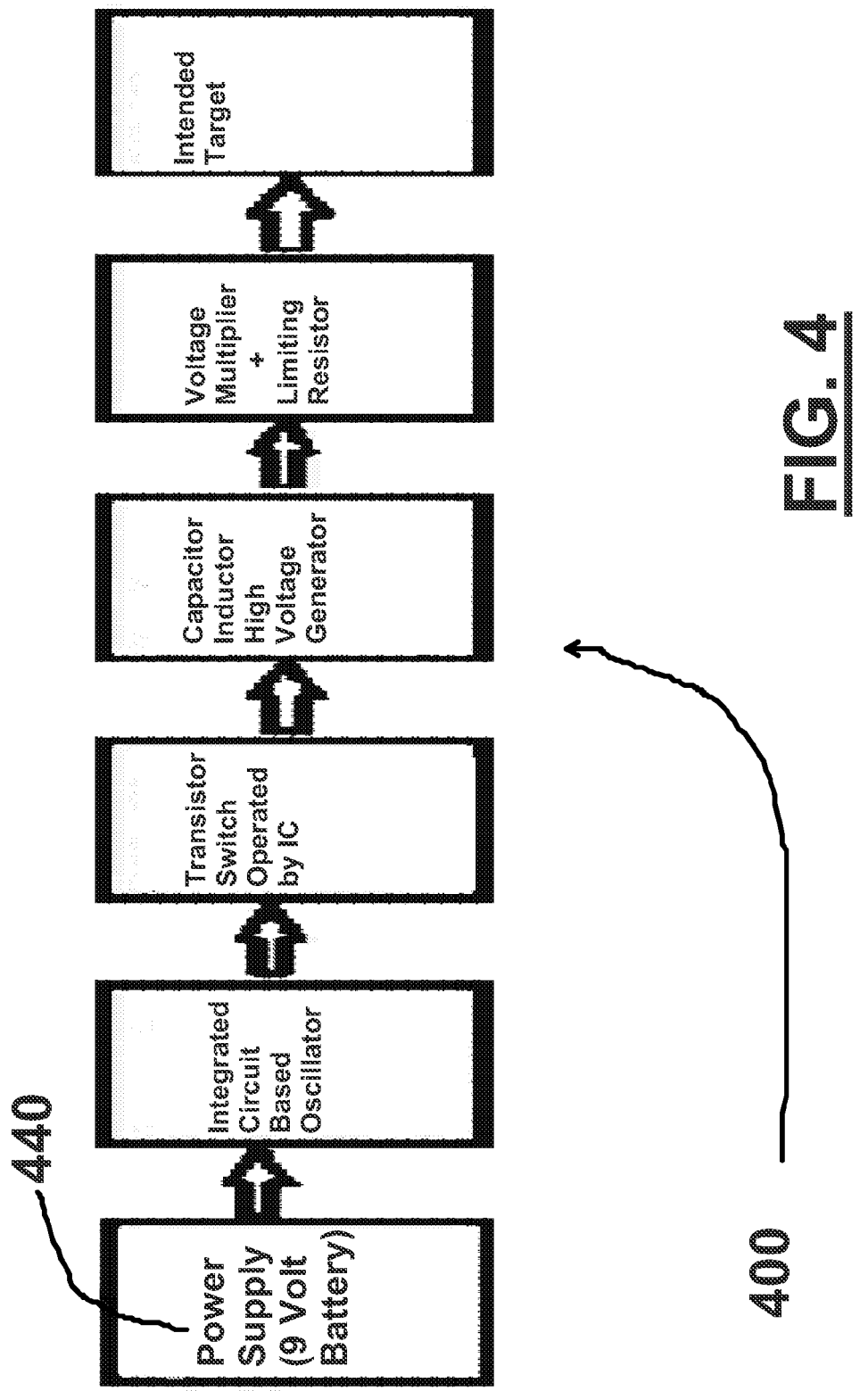
FIG. 4 is a schematic diagram of the operations of one embodiment using an inductor based high voltage generator circuit.
Figure 5:
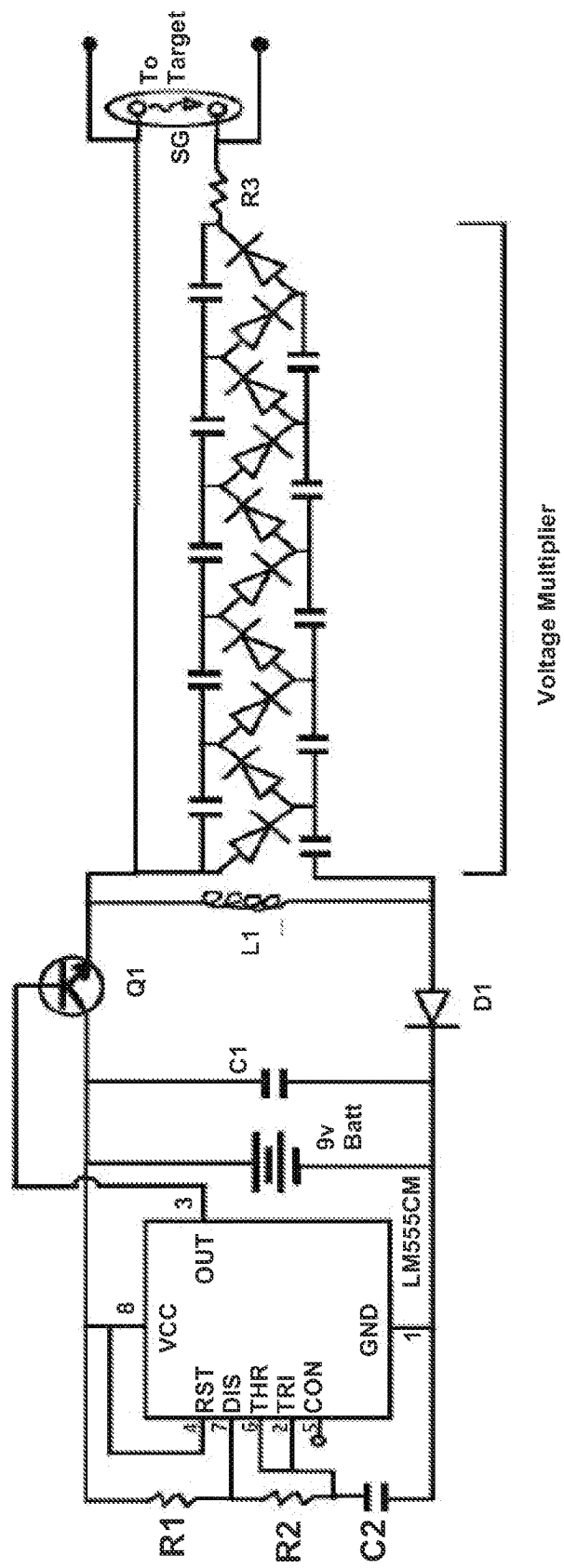
FIG. 5 is a diagram of an inductor based high voltage generator circuit for use in the operations of FIG. 4.

The following is a list of acronyms which are used:
(1) BEMF: Back E.M.F. (electromotive force) or also called CEMF (Counter Electromotive Force)
(2) LOPT: Line Output Transformer
(3) IC: Integrated Circuit
(4) LiPo: Lithium Polymer
(5) Li-ion: Lithium Ion FIG. 4 is a schematic diagram of the operations of one embodiment of a personal defense system 400 incorporating a shocking circuit 500 using an inductor based high voltage generator circuit. FIG. 5 is a diagram of an inductor based high voltage generator circuit 500 for use in the operations personal defense system 400. Shocking circuit 500 works by using an integrated circuit, at a set frequency, to operate a transistor controlling a capacitor's discharge through an inductor. After the capacitor discharges through the inductor, the magnetic field in the inductor breaks down and induces a current in the opposite direction of application. This secondary current is of higher voltage than the original current. The secondary current is carried to the voltage multiplier which steps up the voltage even higher to 50,000 volts. The voltage multiplier contains a limiting resistor which limits the current that is passed to the animal/human target. The capacitor becomes charged and is ready to discharge again.

FIG. 5 is a diagram of shocking circuit 500 which works by using an IC to generate the necessary oscillation for Q1 to open and close at a set frequency. R1, R2, and C2 control the frequency of oscillation that LM555CM generates. Battery 1 is a 9 volt LiPo or Li-ion battery used to power the stun gun circuit. As Q1 opens and closes, the charge is dissipated through L1. L1 is the primary inductor and as the charge being applied quickly rises and then falls, the magnetic field on L1 produces a strong BEMF. The BEMF is blocked by D1 and is allowed to pass onto the voltage multiplier. In this example, the voltage multiplier is made of 10 stages. The number of stages could vary depending on the final circuit requirements. The high voltage produced by the voltage multiplier is current limited by R3 and sent to the spark gap and connected electrodes to the spark gap.

Figure 6:
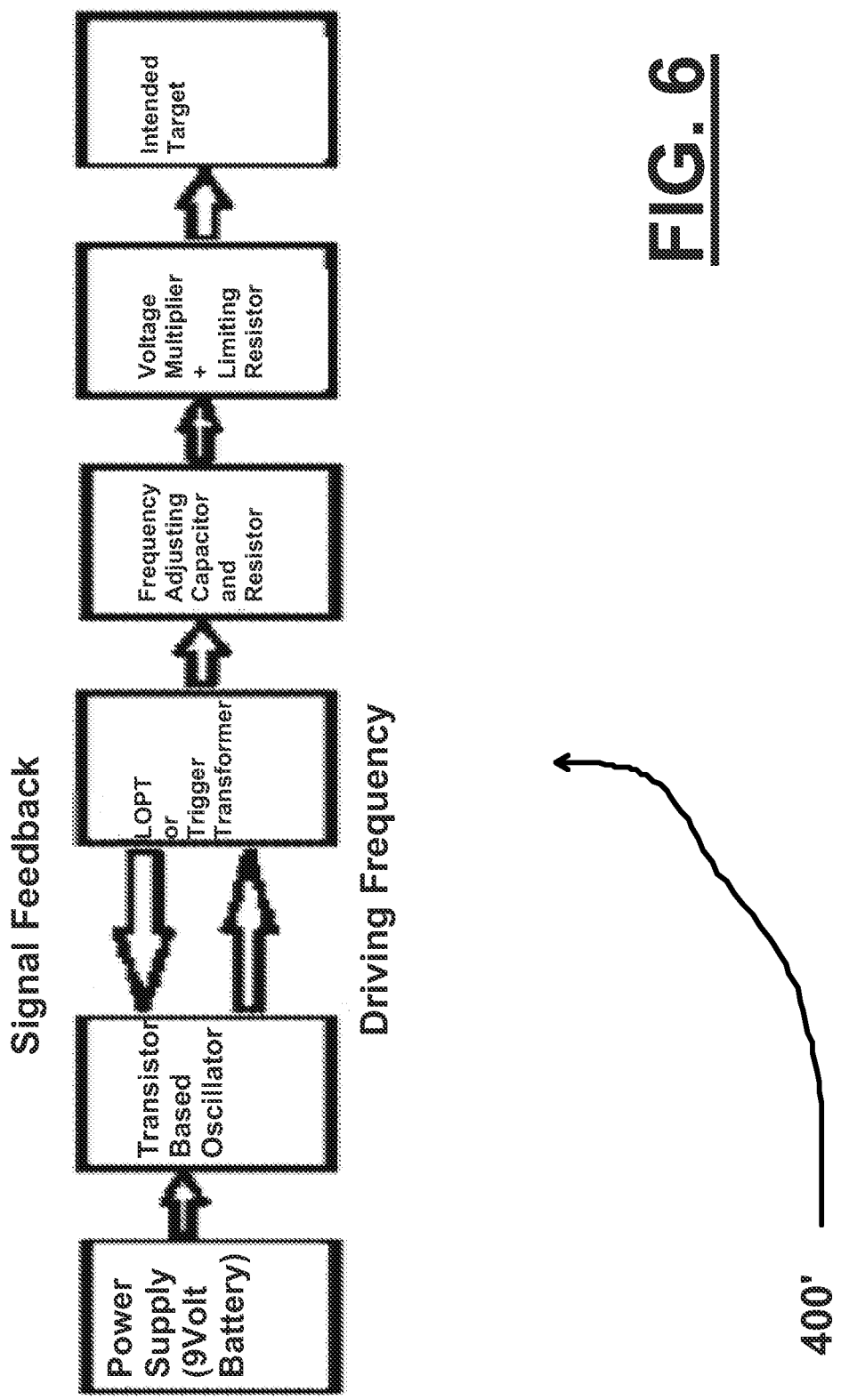
FIG. 6 is a schematic diagram of the operations of one embodiment using an LOPT based high voltage generator circuit.
Figure 7:
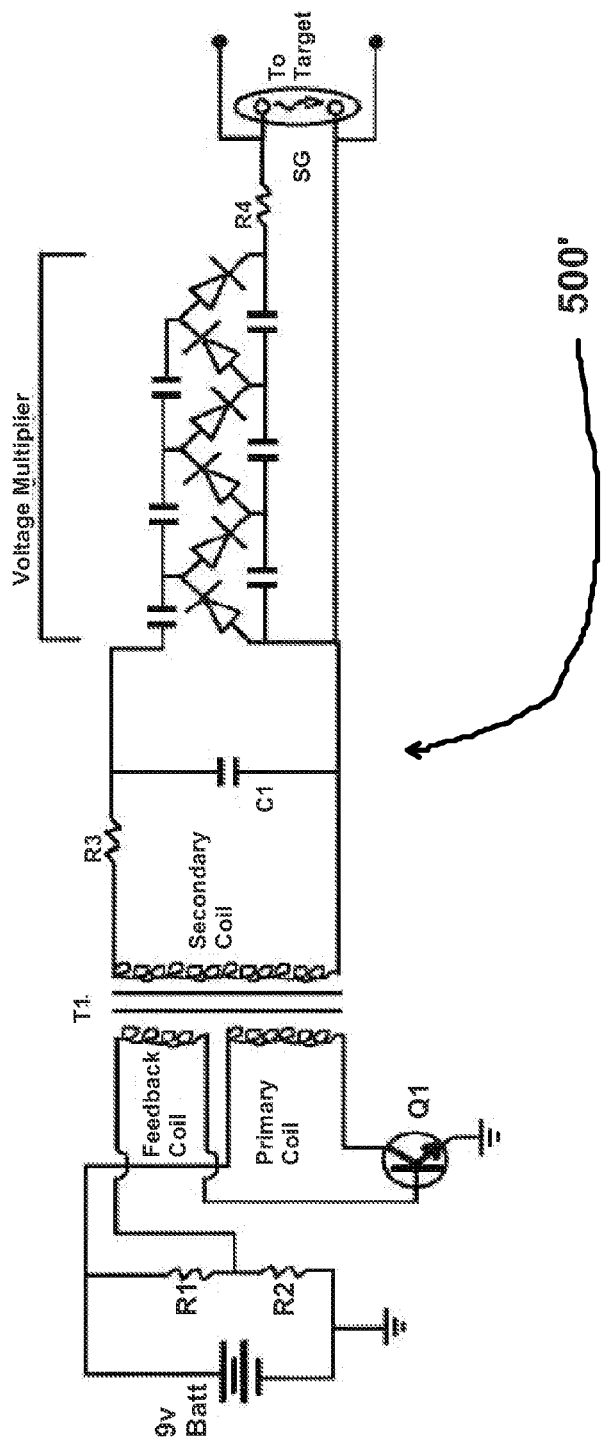
FIG. 7 is a diagram of a LOPT based high voltage generator circuit for use in the operations of FIG. 6.

FIG. 6 is a schematic diagram of the operations of one embodiment of a personal defense system 400' incorporating a shocking circuit 500' using an LOPT based high voltage generator circuit. FIG. 7 is a diagram of a LOPT based high voltage generator circuit 500' for use in the operations of personal defense system 400'. Shocking circuit 500' works by using a transistor based oscillator with secondary feedback from a Line Output Transformer [LOPT] or Trigger Transformer. As the inductance of the circuit changes, so does the frequency of oscillation in the transistor based oscillator. Those changes are accounted for with a coupled capacitor and resistor network which control final output frequency to a voltage multiplier. The voltage multiplier steps up the primary voltage to 50,000 volts and this goes through a limiting resistor which limits the current that is passed to the animal-human target.

FIG. 7 is a diagram of shocking circuit 500' which works by the Secondary Coil current draw pushing resonance to Q1, which drives the primary coil. Initially the Feedback Coil in energized biasing Q1 and allowing current to flow through the Primary Coil. The magnetic coupling between the Primary Coil and the Secondary Coil effectively shunts the Feedback Coil from allowing current to pass by changing the Feedback Coil's inductance. Since the current can no longer flow, Q1 switches off. The cycle repeats once the magnetic field of T2 drops low enough to allow current to pass through the Feedback Coil again. Battery 1 is a 9 volt LiPo or Li-ion battery used to power the stun gun circuit. Secondarily, R3 and C1 modify the standing frequency of the circuit to the voltage multiplier. The voltage multiplier in this case is made of six (6) stages, but this could change depending on final circuit requirements. Finally, R4 limits the current to the spark gap and to the animal-human target.

Figure 8:
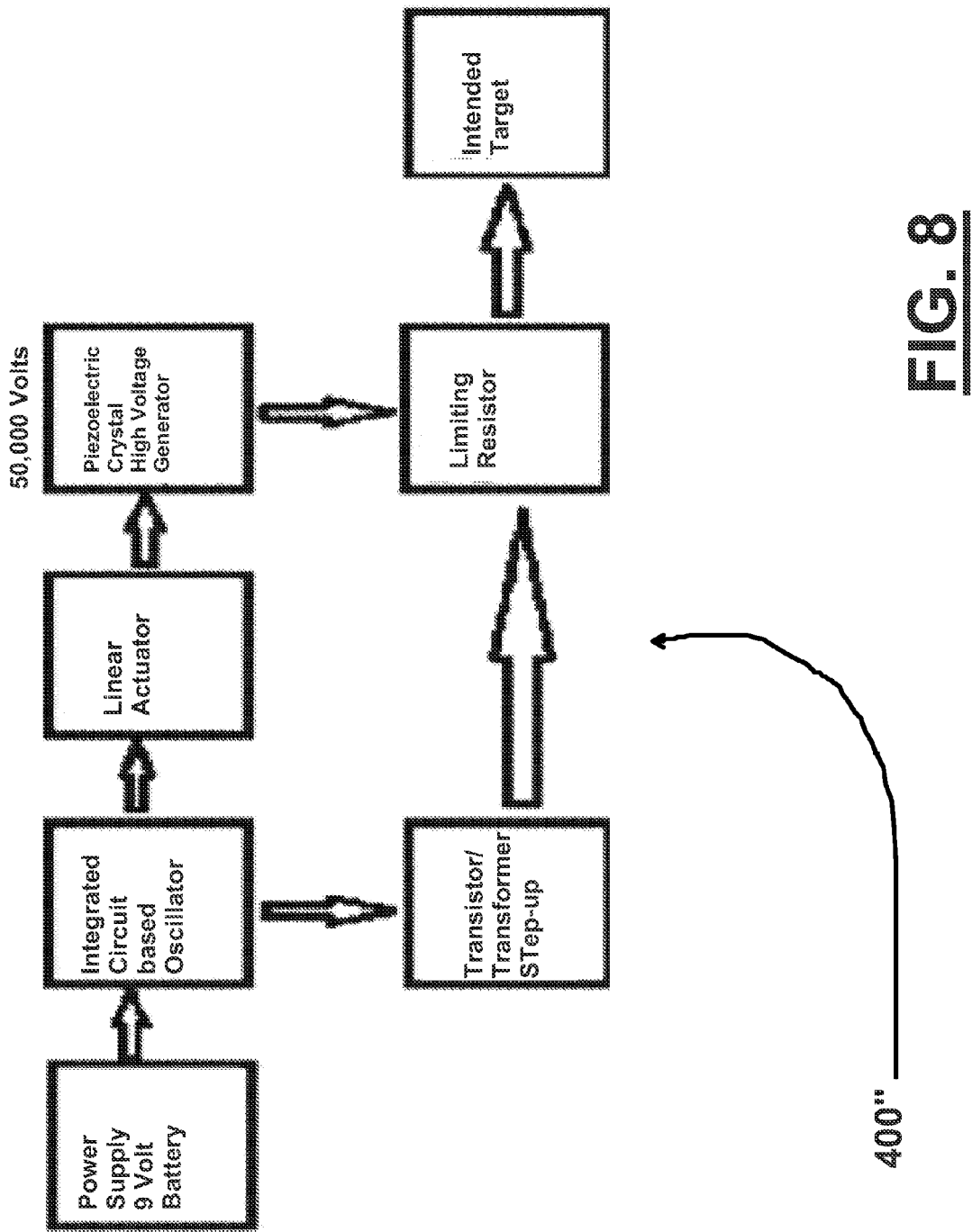
FIG. 8 is a schematic diagram of the operations of one embodiment of a piezoelectric based high voltage generator circuit.
Figure 9:
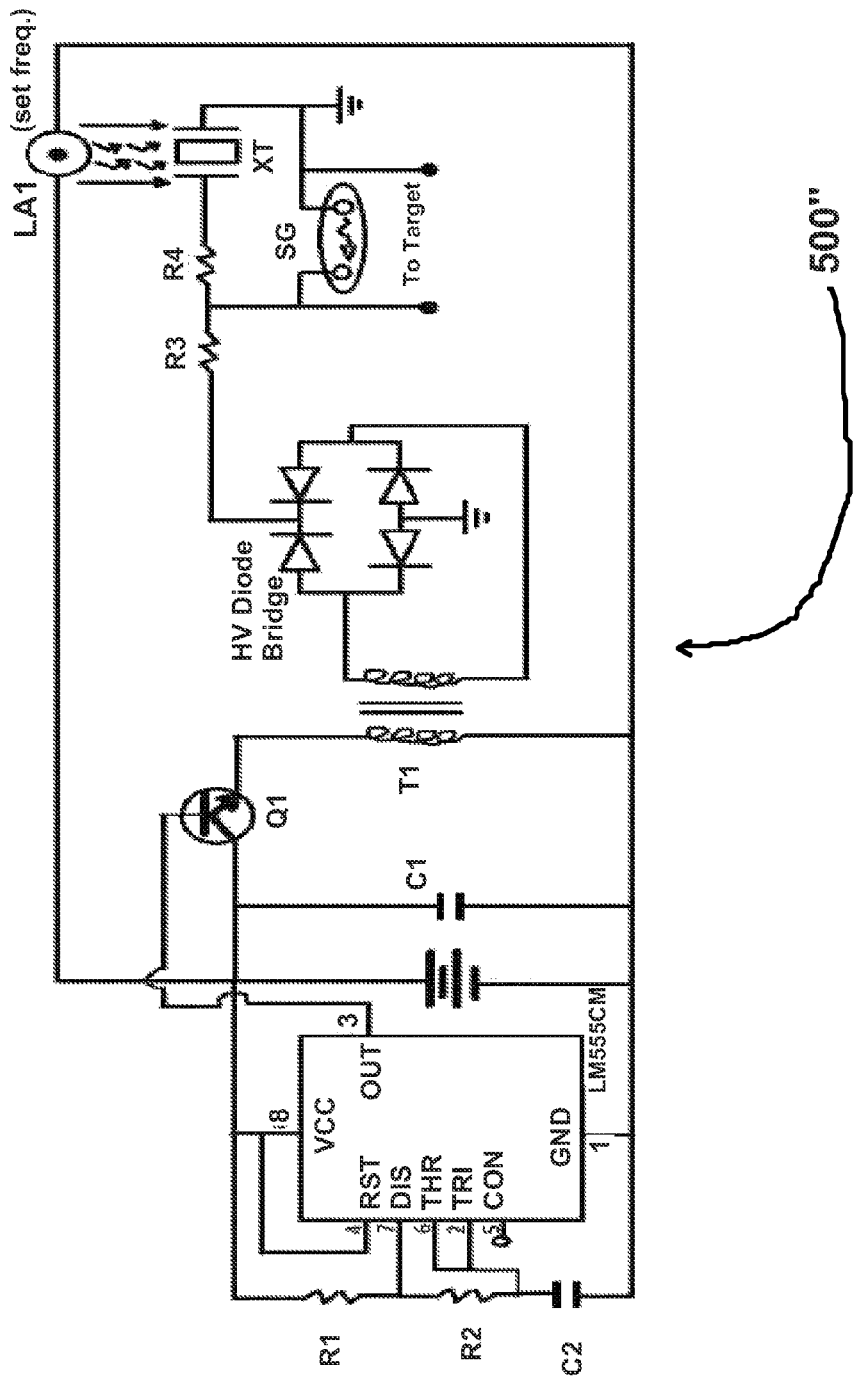
FIG. 9 is a diagram of the a piezoelectric-based high voltage generator circuit for use in the operations of FIG. 8.

FIG. 8 is a schematic diagram of the operations of one embodiment of a personal defense system 400" incorporating a shocking circuit 500" using a piezoelectric based high voltage generator circuit. FIG. 9 is a diagram of the a piezoelectric based high voltage generator circuit 500" for use in the operations of personal defense system 400". Shocking circuit 500" works by using an IC based oscillator to drive both a linear actuator and a transistor driven step-up transformer. The linear actuator compresses a piezoelectric crystal to generate a high voltage (40,000-50,000 volts), low amperage signal. The step-up transformer generates a lower voltage (400-2,000 volts), higher amperage signal. Both the piezoelectric generator and the transistor driven step-up transformer send their signals to limiting resistors where each signal is combined and protected. When the intended animal-human target receives a shock, the limiting resistors limit the current that is passed to the animal-human target, but contains the necessary voltage to penetrate clothing while also containing the necessary amperage to disable the target.

Shocking Circuit 500"'s High Voltage Diode Bridge must be able to sustain (2,000-4,000 volts) approx. voltage spikes from XT, the piezoelectric crystal being squeezed by Linear Actuator [LA1]. R1, R2, and C2 are chosen to control LM555CM's oscillation frequency. Battery 1 is a 9 volt LiPo or Li-ion battery used to power the stun gun circuit. C1 is chosen to help facilitate a quick discharge to T1 through Q1, an NPN transistor. The oscillation frequency of LM555CM is in tune with the set oscillation frequency of LA1. R3 and R4 are chosen to reduce the voltage spike on the High Voltage Diode Bridge and to regulate current to the intended animal/human target.

As to a further discussion of the manner of usage and operation of the present invention, the same should be apparent from the above description. Accordingly, no further discussion relating to the manner of usage and operation will be provided.

The following is a list of reference numerals:

| LIST FOR REFERENCE NUMERALS | |
|---|---|
| (Part No.) | (Description) |
| 10 | combination cellular phone and personal defense system |
| 100 | cellular telephone |
| 110 | housing |
| 111 | wall |
| 112 | wall |
| 113 | wall |
| 114 | wall |
| 120 | cellular phone electronics |
| 130 | visual display |
| 140 | keypad |
| 150 | antenna |
| 160 | rechargeable battery |
| 170 | recharge port |
| 300 | protective case |
| 310 | housing |
| 311 | wall |
| 312 | wall |
| 313 | wall |
| 314 | wall |
| 316 | wall |
| 320 | interior |
| 350 | recharge port |
| 400 | personal defense system |

-continued

LIST FOR REFERENCE NUMERALS

| (Part No.) | (Description) |
|---|---|
| 410 | shocking system |
| 420 | pair of prongs |
| 430 | activation switch |
| 440 | power source |
| 450 | safety switch |
| 500 | shocking circuit |

All measurements disclosed herein are at standard temperature and pressure, at sea level on Earth, unless indicated otherwise. All materials used or intended to be used in a human being are biocompatible, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims:

We claim:

1. A cellular phone and protective case incorporating a personal defense system self-defense comprising:
    (a) an cellular telephone having a housing, the housing including a front face with display;
    (b) the housing further including a periphery defined by a face, side walls, and bottom;
    (c) a protective case having a plurality of side walls and bottom, and an interior defined by the side walls and bottom;
    (d) a personal defense shocking system incorporated into the interior of the protective case and a plurality of shocking prongs extending from the protective case;
    (e) an activation switch operatively connected to the personal defense shocking system; and
    (f) the cell phone fitting inside the protective case with at least 50 percent of the display being visible when inside the protective case interior, the cell phone being detachably connectable to the protective case, wherein the sidewalls of the housing of the cell phone have a depth D1, the sidewalls of the case have a depth D2, and the ratio D2/D1 is between 1.3 and 3.

2. The cell phone of claim 1, wherein personal defense shocking system is powered by a battery which is independent from a power source for the cell phone.

3. The cell phone of claim 1, wherein the ratio D2/D1 is between 1.5 and 2.5.

4. The cell phone of claim 3, wherein the ratio is between 2 and 3.

5. The cell phone of claim 1, wherein the ratio D2/D1 is between 1.3 and 1.5.

6. The cell phone of claim 1, wherein the ratio D2/D1 is between 1.4 and 1.6.

7. The cell phone of claim 1, wherein the ratio D2/D1 is between 1.5 and 1.7.

8. The cell phone of claim 1, wherein the ratio D2/D1 is between 1.6 and 1.8.

9. The cell phone of claim 1, wherein the ratio D2/D1 is between 1.7 and 1.9.

10. The cell phone of claim 1, wherein the ratio D2/D1 is between 1.8 and 2.

11. A cellular phone and protective case incorporating a personal defense system self-defense comprising:
    (a) an cellular telephone having a housing, the housing including a front face with display;
    (b) the housing further including a periphery defined by a face, side walls, and bottom;
    (c) a protective case having a plurality of side walls and bottom, and an interior defined by the side walls and bottom;
    (d) a personal defense shocking system incorporated into the interior of the protective case and a plurality of shocking prongs extending from the protective case;
    (e) an activation switch operatively connected to the personal defense shocking system; and
    (f) the cell phone fitting inside the protective case with at least 50 percent of the display being visible when inside the protective case interior, the cell phone being detachably connectable to the protective case, wherein the cell phone housing has dimensions length L1 and width W1, and the protective case has dimensions length L2 and width W2, and the dimensions of the of the respective lengths and the respective widths are between 1 and 15 percent of each other.

12. The cell phone of claim 11, wherein the respective dimensions are between 2 and 14 percent of each other.

13. The cell phone of claim 11, wherein the respective dimensions are between 3 and 12 percent of each other.

14. The cell phone of claim 11, wherein the respective dimensions are between 10 and 15 percent of each other.

* * * * *